March 13, 1962  R. COLOMBO  3,024,496
METHOD AND APPARATUS FOR MANUFACTURING
CORRUGATED THERMOPLASTIC SHEETS
Filed March 26, 1958  6 Sheets-Sheet 1

March 13, 1962 R. COLOMBO 3,024,496
METHOD AND APPARATUS FOR MANUFACTURING
CORRUGATED THERMOPLASTIC SHEETS
Filed March 26, 1958 6 Sheets-Sheet 3

R. COLOMBO 3,024,496

METHOD AND APPARATUS FOR MANUFACTURING
CORRUGATED THERMOPLASTIC SHEETS

Filed March 26, 1958

March 13, 1962  R. COLOMBO  3,024,496
METHOD AND APPARATUS FOR MANUFACTURING
CORRUGATED THERMOPLASTIC SHEETS
Filed March 26, 1958  6 Sheets-Sheet 5

March 13, 1962  R. COLOMBO  3,024,496
METHOD AND APPARATUS FOR MANUFACTURING
CORRUGATED THERMOPLASTIC SHEETS
Filed March 26, 1958  6 Sheets-Sheet 6

United States Patent Office 3,024,496
Patented Mar. 13, 1962

3,024,496
METHOD AND APPARATUS FOR MANUFACTURING CORRUGATED THERMOPLASTIC SHEETS
Roberto Colombo, Turin, Italy, assignor to S. A. S. Lavorazione Materie Plastische (L. M. P.) di M. I. Colombo & C., Turin, Italy
Filed Mar. 26, 1958, Ser. No. 724,098
Claims priority, application Italy Apr. 5, 1957
4 Claims. (Cl. 18—19)

This invention relates to a method and apparatus for manufacturing corrugated thermoplastic sheets, such as polyvinyl, methacrylic, polyethylene resins and the like.

It is the object of this invention to provide a method and apparatus by which a continuous sheet or web of thermoplastic material which is initially flat can be longitudinally corrugated. We understand by longitudinal corrugations such corrugations the generatrices of which extend parallel with the web length.

In its preferred embodiment the improved method comprises the steps of providing a heating zone; applying to the web traction stresses distributed over its width to cause the web to travel continuously through the heating zone; heating the web at the heating zone to the web material softening temperature; simultaneously applying to longitudinal regions of the web between the heating zone and the zone to which traction stresses are applied, forces alternately directed in opposite directions transversely of the surface of the web in order to alternately deflect said regions with respect one to another in opposite directions and simultaneously cool the web at the regions to which the forces are applied.

The improved apparatus comprises sequentially on the web path means through which the web travels adapted to heat the web material on travel therethrough substantially to its softening temperature; at least one mould fitted to one web face through the width of the latter, said mould having a moulding surface made up of superficial regions which are curved to cylindrical shapes the generatrices of which extend in the direction of travel of the web, means for applying the web against said mould surface thereby to shape accordingly the web; means for continuously cooling the moulding surface, and web driving means arranged past the mould for causing the web to travel through said heating means as it is applied against the mould surface.

Further characteristic features of this invention will be understood from the appended specification referring to the accompanying drawing, wherein.

Figure 1:
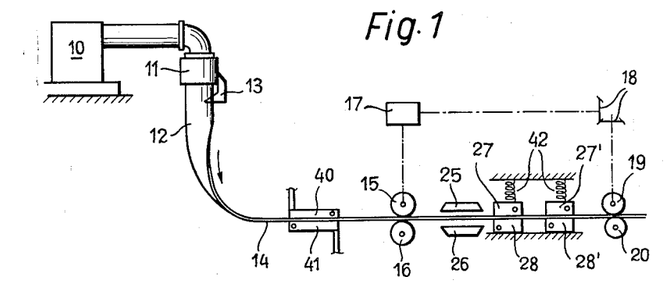
FIGURE 1 is a diagrammatical view of a plant including the improved device.

In FIGURE 1 an extrusion press 10 is shown having an annular extrusion nozzle 11 adapted to form a thermoplastic tube 12. A cutter 13, fitted to the nozzle 11 cuts the tube 12 along a generatrix, so that the tube opens longitudinally and forms a web 14.

This manner of forming thermoplastic webs is known per se in the art and does not therefore require further explanations.

Figure 6:
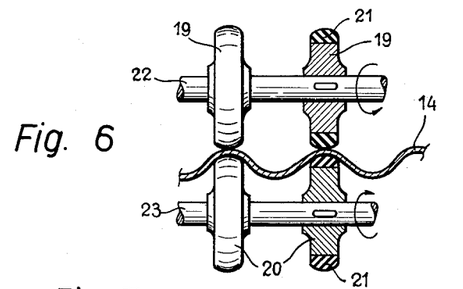
FIGURE 6 is a part view partly in section of a roller arrangement for driving the web.

The resulting web travels over a rectilinear path from the left to the right in FIGURE 1, the web being situated in a horizontal plane, its opposite faces facing upwards and downwards, respectively. This path is defined on one side by rollers or cylinders 15, 16 having smooth surfaces, which frictionally engage the two opposite faces of the web and feed the latter to the right on the drawing, the rollers 15, 16 being driven by a motor 17 at a suitable peripheral speed. The motor 17 further drives through a bevel wheel pair 18 rollers 19, 20 which are capable of trailing the web and are shown in detail in FIGURE 6. As is visible in the latter figure the rollers 19, 20 frictionally act on opposite faces of the web 14 and are provided for this purpose with circumferential rubber linings 21. At the region of the trailing rollers the web is in a corrugated and set condition. The rollers 19 are provided in a sufficient number for applying to the web 14 traction forces distributed throughout its width, the rollers being each fast in rotation with the shaft 22 driven by the motor 17. The number of rollers 20 equals the number of rollers 19, the rollers 20 being likewise fixedly connected in rotation with their shaft 23 extending parallel with the shaft 22 and coupled with the latter for rotation at the same speed. The rollers 20 are respectively co-planar with the respective rollers 19, all the rollers 19, 20 being equal in outer diameter and applying to the web 14 equal trailing forces at the same feed rate throughout the width of the web.

Two infra-red ray radiators 25, 26 are shown in FIGURE 1 extending in front of the opposite faces of the web 14 throughout the width of the web, the heating power of which is adjusted to heat the web to its softening temperature as it travels between the two radiators. Two moulds 27, 28 are placed directly down stream the radiators 25, 26 against the opposite faces of the web 14 and may be followed a small distance further by similar moulds 27', 28', which shall be described in detail with reference to FIGURES 2 through 5.

Figure 2:
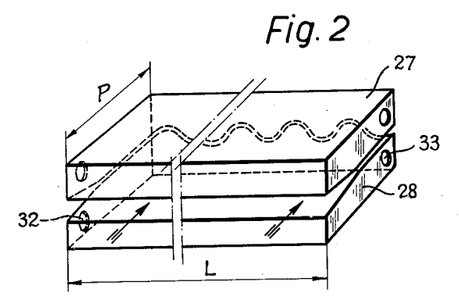
FIGURE 2 is a perspective view of a pair of moulds.
Figure 3:
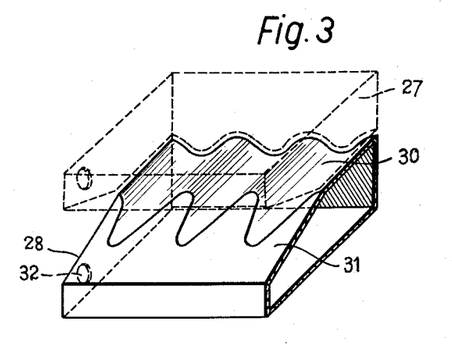
FIGURE 3 is a perspective front top view of part of the lower mould, the top mould being denoted by dashlines.

In the embodiment shown in FIGURES 2 and 3, each mould comprises a sheet metal case 27, 28 respectively, the width L of which at least equals the width of the web, its length P being about 25-40 cm. The facing portions of the cases act as moulding surfaces, the surface 30 of the mould 28 being visible in FIGURE 3. The surface 30 as well as its corresponding moulding surface of the mould 27 is corrugated, originating cylindrical surface regions, the generatrices of which extend in the direction of travel of the web 14. The inlet side of the corrugated surface 30 is bevelled, the bevel being obtained by means of a wall 31 converging towards the opposite mould in the direction of travel of the web. Holes 32, 33 are provided in two opposite lateral walls of the mould 28 for admitting thereto and evacuating therefrom, respectively, a coolant, mostly water.

The mould 27 is similar in construction to the mould 28, but for the fact that the corrugations of the moulding surface of the mold 27 are complemental to those of the surface 30, as denoted by dot-and-dash line in FIGURES 2 and 3. The arrows in FIGURE 2 denote the inlet direction in which the web 14 enters the space between the two moulds.

Reverting to FIGURE 1, cooling means for the web 14 are arranged ahead the feed rollers 15, 16, said cooling means being denoted by 40, 41 and comprising sheet metal cases similar to the cases 27, 28 except for that the surfaces of the cases 40, 41 facing the opposite sides of the web 14 are flat, coolant, such as water flowing through both cases.

Considering the means described and illustrated above and referring moreover to FIGURE 7, the process shall now be described for continuously corrugating the web 14 issuing from the press 10, neglecting for the present the function of the cooling means 40, 41.

The web 14 is assumed to have reached the nip between the driving rollers 19, 20 which apply to the web traction stresses distributed throughout its width. The radiators 25, 27 are then energised and moulds 27, 28 and if desired the molds 27', 28' are placed against the opposite faces of the web, the moulds 27', 28' being similar in construction and operation to the moulds 27, 28.

The web region between the radiators 25, 26 is heated to its softening temperature and moves towards the moulds 27, 28 in the direction of the arrows in FIGURE 2, further transverse incremental regions on the web 14 entering the space between the radiators for heating and softening. The moulds 27, 28 and 27', 28', are pressed against the opposite web faces by their corrugated surfaces. For this purpose any suitable means such as springs 42 can be provided, though in some cases the weight of the top mould which contains cooling water may be sufficient. The moulds are not displaceable in the direction of travel of the web 14, but may be lifted and lowered at will and means can be provided for adjusting the load applied by the moulds to the two faces of the web.

Figure 7:
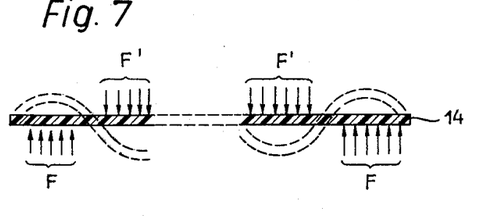
FIGURE 7 diagrammatically shows the action of the moulds on the thermoplastic web.

Since the moulding surfaces of the individual moulds form up-raised and depressed regions alternating through the web width, it will be obvious that as the web enters the space between the moulds, its longitudinal part regions undergo systems of the forces F and F' (FIGURE 7) alternately directed in opposite directions, perpendicular to the original surface of the web, as the latter travels perpendicular to the plane of FIGURE 7. Consequently, alternate longitudinal web regions are deflected from their original plane, as indicated by dash-lines, each of them being drawn and stretched transversely to form a half-wave of a sinusoidal corrugation.

As mentioned above the moulds 27, 28, 27', 28' are cooled. Cooling is necessary in order to set the corrugations imparted to the sheet, but is also and above all required and essential to keep the softened web material from sticking against the moulding surfaces of the moulds, and in order to set up in the web material certain conditions of a molecular nature, which are extremely important to the standard of the final product.

For, on first contact wtih the strongly cooled moulds hardened films are formed on the web faces which keep the material against sticking to the mould. This effect is further promoted by the inclined walls 28 (FIGURE 3), which radiate cold towards the web faces and preliminary set the latter superficially, already before the web enters the space between the corugated surfaces of the moulds. Subsequently, as cold propagates throughout the web thickness, forces such as F and F' effect a transverse drawing of the web 14 which, notwithstanding the corrugations, keeps its original width substantially unaltered, as its thickness decreases and the molecules in the material are all oriented in preferential directions, transversely of the direction of travel and parallel with the web faces. However, it should be recalled that the web further undergoes traction stresses, which are uniformly distributed throughout its width by the rollers 19, 20, whereby the molecules of the web material are ultimately oriented parallel with the corrugations of the web, thereby imparting to the latter a considerable elasticity and mechanical strength. This elasticity and strength therefore represent the main advantage of the webs manufactured according to this invention over corrugated webs otherwise manufactured, such as by extrusion through a corrugated die.

It has been found that it is irrelevant for the web material to be fully hardened on issue from the first pair of the moulds. When the web is of an appreciable thickness it is even advantageous to draw the web between a further pair of moulds, such as 27', 28', which effect ultimate hardening thereof, whereby the web length between the pair 27, 28 and pair 27', 28' further undergoes a certain longitudinal stretch combined with a certain structural setting of the molecules after the first drawing stage between the moulds 27, 28.

At this point the function of cooling means 40, 41 and feed rollers 15, 16 should be emphasized, which are arranged upstream the radiators 25, 26. The cases 40, 41 form a sort of die, in which the web 14 is drawn and cooled as it is pulled by the rollers 15, 16. For this purpose the facing walls of the cases 40, 41 which extend throughout the width of the web 14 are flat and polished, the cases being pressed against the opposite faces of the web by any suitable means, preferably adjustable in pressure, similar to that acting on the moulds 27, 28. In this manner even before the web material 14 enters the space between the moulds 27, 28, it undergoes a longitudinal stretch. The drawn molecules are therefore "annealed" and their mutual arrangement consolidated as the material travels between the radiators 25, 26, whereupon the moulds 27, 28 effect a prevailingly transverse drawing.

In order to ensure a prevailingly transverse drawing between the moulds 27, 28, the mould size in the direction of feed of the web should be relatively small of the order of a few tens of centimeters (for instance 25–40 cm. as mentioned above) in order to avoid considerable traction stresses and to permit of the web expanding transversely and maintaining its original width substantially unaltered notwithstanding its conversion from its flat to its corrugated shape. With the same purpose in view, the peripheral rates of speed of the feed rollers 15, 16 and driving rollers 19, 20 should be tuned to each other. As a result of a larger number of tests carried heretofore it was found that the peripheral rate of speed of the rollers 19, 20 should be lower or at the utmost equal to the rate of speed of the rollers 15, 16. The most advantageous results are obtained with peripheral speeds of the rollers 19, 20 lower by about 1–3% than the rate of speed of the rollers 15, 16. When all the rollers are equal in diameter, it will be sufficient to select a ratio of the bevel wheel pair 18 such that the rollers 19, 20 perform 97 to 99 turns to 100 turns of the rollers 15, 16.

Figure 4:
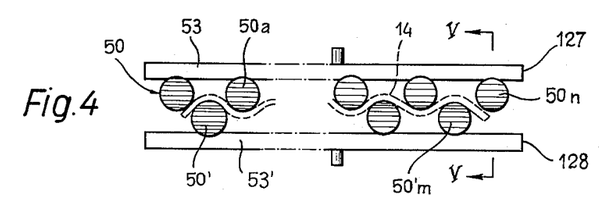
FIGURE 4 is a front view in the direction of travel of the web of a further construction of the two moulds.
Figure 5:
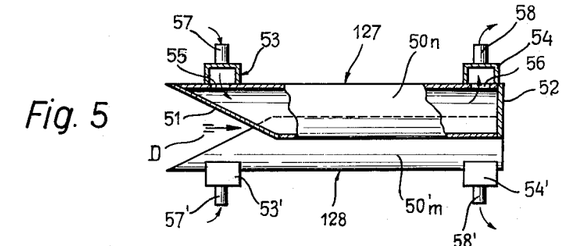
FIGURE 5 is a sectional view on line V—V of FIGURE 4.

The moulds 27, 28 can be replaced by the moulds 127, 128 shown in FIGURES 4 and 5. Each of the moulds comprises a number of hollow metal cylinders 50—50a . . . 50n, 50' . . . 50'm respectively, closed at their ends by walls 51, 52 and arranged in parallel spaced relationship through the width of the web 14. The cylinders of the mould 127 are arranged opposite the voids between the cylinders of the mould 128 and vice versa. All the cylinders in one mould are rigidly interconnected by manifold or collector tubes 53, 54 and 53', 54', respectively, the inside of each cylinder connecting with the manifold tubes through passages denoted by 55 and 56 in FIGURE 5. Moreover, as will be seen from FIGURE 5, the manifold tubes are arranged in nearest proximity to the cylinder ends and are provided with nipples 57, 57' and 58, 58' for inlet to and outlet from the cylinders of coolant such as water. The arrow D in FIGURE 5 denotes the direction and the plane on which the web 14 enters the space between the moulds 127, 128.

It will be seen that the leading edges of the cylinders comprising walls 51 are bevelled, said bevel being obtained by slanting the wall 51 towards the opposite mould looking in the direction of the arrow D. It will be seen moreover that in both embodiments the top and bottom mould are of the same length (P, FIGURE 2) in the direction of travel of the web, the moulds being constantly directly opposite, that is not staggered in the direction of travel of the web. This arrangement is of considerable practical importance in avoiding distortions of the corrugated sheets manufactured according to this invention. Still in respect of possible distortions it is advantageous for both moulds to be cooled as nearly to the same temperature as possible. Water circulation through the moulds should therefore be relatively intensive, so that both faces of the web are sharply and equally cooled to a temperature of 15–20° C., at which a surface film is formed on each face, which is sufficiently set and hardened.

With certain materials or when operating at high speed, the friction between the web and operating mould surfaces might oppose a resistance against feed such as to tear the web. It has been found that in order to avoid this inconvenience it will be sufficient to move or vibrate either mould such as the top mould alternately to and fro in a direction perpendicular to the general plane of the web as the web travels between the moulds. The width of said movement should be relatively small, at any rate smaller than the depth of the deformations which have to be imparted to the web. With this object in view moulds such as 27, 27', FIGURE 1 could be suspended for instance from suitable eccentrics keyed to driving shafts rotating in a given ratio with respect to the speed of the rollers 19, 20.

The corrugated web issuing from the driving rollers 19, 20 can obviously be cut to sheets of a desired length through any known suitable means.

The corrugated sheets obtained in the manner described above are of a cross-section which is of a generally sinusoidal form similar to the form of well known corrugated metal sheets currently employed as roof coverings. Consequently, for instance in covering roofs, the attachment of the instant sheets to a carrying structure involves perforation of the sheets by nails or screws; moreover, for the joints between adjacent sheets to be tight enough against atmospheric agents, the sheets should overlap by a considerable extent.

It will be obvious that the above and further difficulties and problems could be avoided or eliminated if it were possible to provide at least along the longitudinal edges of a sheet undercut corrugations, for instance of a dove-tail or similar cross-sectional shape; it being understood that by causing the dove-tail profiles of two contiguous sheets to intermesh, a tight seal easily results between the edges of the sheets. Moreover, by providing in the supporting framework complemental dove-tail shaped members, the covering sheets may be anchored to the framework without necessarily employing nails or screws.

It will now be seen with reference to FIGURES 8 to 15 of the accompanying drawing that the invention makes it possible to manufacture corrugated sheets in which the corrugations at least adjacent the longitudinal edges of the sheet comprise undercut portions.

Figure 8:
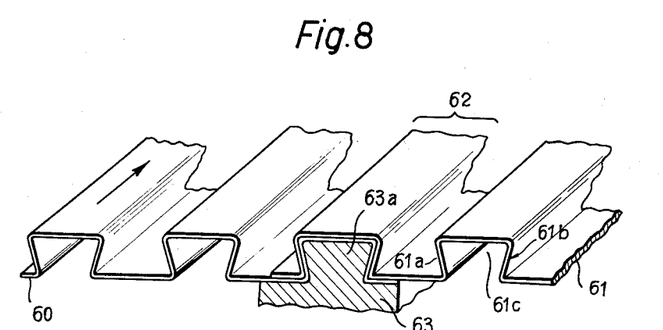
FIGURE 8 is a perspective view of an end region of two webs in a roof-covering structure, in which the corrugations of the webs are formed with undercut zones.

In FIGURE 8, 60 and 61 denote two polyvinyl resin sheets, the longitudinal direction of which is denoted by an arrow. The two sheets are each corrugated according to a trapezoidal wave, the ridges and valleys of which extend in the longitudinal direction of the sheets. The corrugations each comprise undercut wall portions such as 61a and 61b, so that each of the valleys such as 61c is of a dove-tail shaped cross-section. It will be seen in the figure that at the joint 62 of the contiguous longitudinal edges of the sheets the dove-tail shaped valley formed on the sheet 61 is engaged on the ridge formed on the sheet 60. This interlocking is easy to carry out through the elasticity of the sheet material and provides a mechanically strong water-tight joint which will not let rain water through. The framework 63 is formed with at least a member 63a of a dove-tail shaped profile and size complemental to those of the valleys 61c, so that the sheets 60, 61 can be interlocked on said members 63a as shown.

Figure 9:
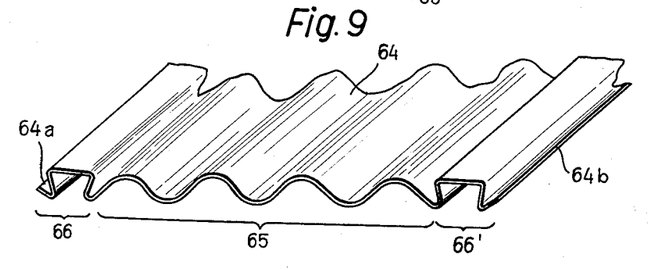
FIGURE 9 shows a modified web adapted for use in the structure shown in FIGURE 8.

In the modification according to FIGURE 9, the sheet 64 comprises a central longitudinally extending region 65 which is sinusoidally corrugated and merges near its longitudinal edges 64a, 64b into longitudinal marginal regions 66, 66', respectively, of dove-tail shaped corrugations serving for jointing the sheets substantially in the same manner as shown in FIGURE 8.

Figure 10:
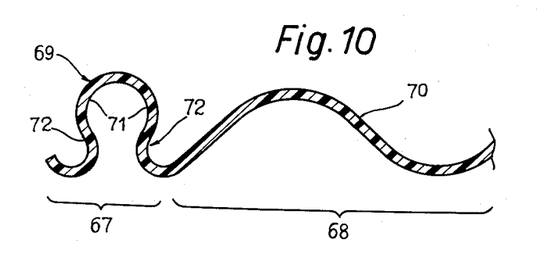
FIGURE 10 is a cross-sectional view of a longitudinal edge portion of a further web which could be employed in a structure as shown in FIGURE 8.
Figure 11:
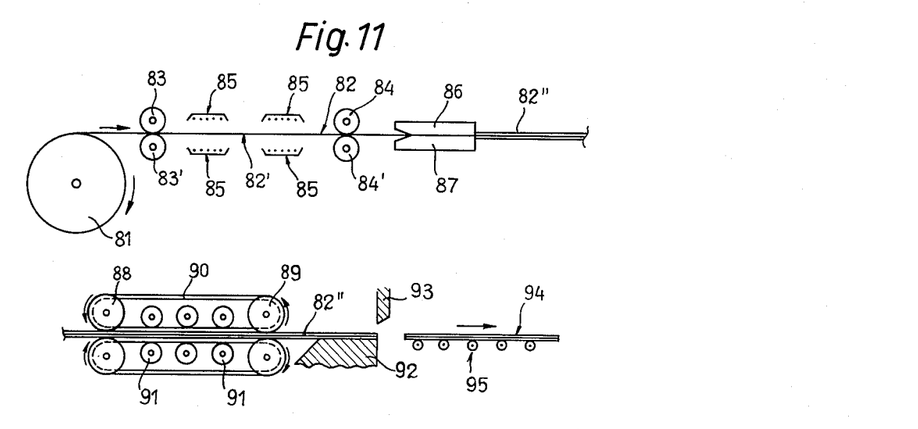
FIGURE 11 diagrammatically shows a plant for manufacturing webs as shown in FIGURES 8 to 10.

In the modification shown in FIGURE 10, the longitudinal marginal region 67 of a sheet 70 is corrugated to a loop 69, while a central longitudinally extending region 68 of the sheet is sinusoidally corrugated similarly to the region 65 in FIGURE 9. The loop 69 comprises undercut cross-sectional portions 71, 72 and is therefore adapted to form a type of joint similar to that shown in FIGURE 8, with the same possibilities of anchorage to a framework by means of a member of a complemental shape equivalent to the member 63a in FIGURE 8.

Thermoplastic sheets of the type shown in FIGURES 8 to 10 could be manufactured by extrusion. However, such method requires firstly the use of an extrusion press of considerable power, together with suitable extrusion dies, while it would be preferably to start from a web or sheet of a thermoplastic material manufactured in any more convenient manner, which would be deformed to the form desired in the individual cases. Moreover, extruded thermoplastic sheets are drawn and stretched in a longitudinal direction only, while it is known that strength is improved if the sheet is drawn both longitudinally and transversely. Such drawing has already been effected by the equipment described and illustrated with reference to FIGURES 1 to 7; improvements and modifications to such equipment shall now be described, through which sheets of the type illustrated above with reference to FIGURES 8 to 9 can be obtained.

Generally, the equipment comprises a roll 81 (FIGURE 11) of an endless sheet or web 82 of thermoplastic material, which is unrolled by a pair of driven transverse rollers 83, 83' and the web led over a substantially horizontal path on which a further pair of driven rollers 84, 84' is arranged. In the gap between the two pairs of rollers sets 85 of infra-red heating tubes are arranged transversely above and beneath the web length 82 for softening this web length to the point best suited for drawing and subsequent deformation. Operative conditions of the heating sets 85 depend upon various factors and cannot therefore be set out in detail. Such factors are first of all the nature of the web material, thickness, extent of stretch, depth of corrugations and various other factors.

On issue from the pair of rollers 84, 84' the web 82 is drawn between a pair of moulds 86, 87, which shall be described in detail hereafter, said moulds being strongly water-cooled and deforming the web to its corrugated shape 82". The web may be trailed between the moulds 86, 87 in the manner described with reference to FIGURE 1, or by means of belt drive means indicated in FIGURE 11. This drive means is arranged by pairs in order to frictionally engage the opposite faces of the corrugated web, and each drive means comprises a main pair of pulleys 88, 89, a belt 90 travelling over the pulleys 88, 89 and pressure rollers 92 pressing the belt against the web 82″. One of the pulleys, such as pulley 89 is driven by a motor, so that the web 82″ is clamped between the belts and frictionally carried along to the right on the figure. A cutter 93 and a counter-blade 92 are arranged downstream the drive means and are adapted to sever the corrugated web 82″ to sheets 94 of desired length. A roller conveyor 95 conveys the sheets 94 to the store or packing and shipping department.

Figure 12:
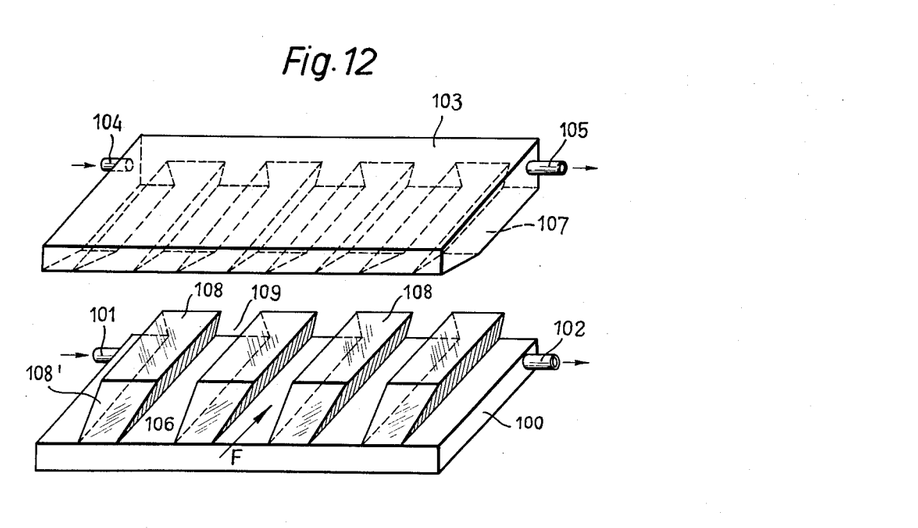
FIGURE 12 is a perspective view of a pair of moulds for use in the plant shown in FIGURE 11.

The moulds shown in FIGURE 12 are adapted to manufacture sheets such as 60, 61 shown in FIGURE 8. Generally, they are very similar to the moulds shown in FIGURES 2 and 3, but for a modified shape of the operative surfaces. More particularly, the bottom mould comprises a sheet metal case 100 which is hollow inside and has attached to its opposite lateral walls tubular connections 101, 102 for the inlet and outlet, respectively, of the cooling water. Similarly, the top mould comprises, a metal case 103 having connections 104, 105. The operative faces 106, 107 of both moulds are substantially complemental to each other and each comprises a set of hollow tenons or ridges 108 of trapezoidal cross-sectional shape, the larger basis of which faces the opposite mould; viewed from the front, i.e. in the direction of feed of the web between the moulds (see arrow F) the ridges 108 actually appear as dove-tail shaped tenons extending in the direction F. A front portion of each tenon is bevelled at 108′ for the purpose of facilitating the entry of the web into the space between the moulds, as will be better understood with reference to FIGURES 13 and 14. The tenons 108 are transversely spaced apart leaving between the tenons a channel 109 capable of accommodating a tenon of the opposite mould and in addition thereto a clearance which is equal to or slightly larger than the thickness of the thermoplastic web to be corrugated.

Though not explicitly shown on the drawing, it will be advantageous for all the edges of the tenons 108 to be somewhat rounded in order to avoid cutting of the web when drawn between the moulds.

As mentioned above, the operative surface of the mould 103 is substantially complemental but for the abovementioned clearance to the mould surface 100. Consequently, in most cases it will be impossible to move the moulds to their cooperating position through a relative vertical displacement as described with reference to FIGURES 2 to 10, inasmuch as the larger bases of the trapezoidal sections of the tenons 108 cannot pass into the channels 109. Therefore a procedure shall be followed as will now be described with reference to FIGURES 13 and 14.

Figure 13:
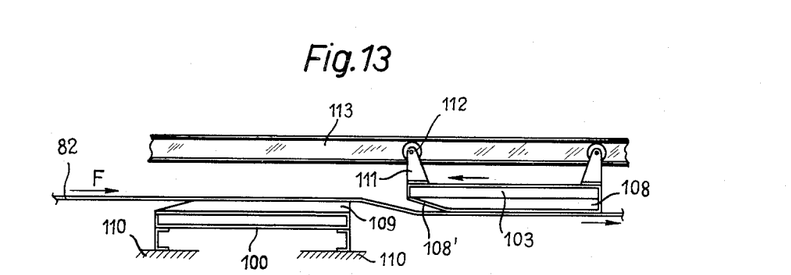
FIGURES 13 and 14 diagrammatically show two sequential steps in the manufacture of webs as shown in FIGURES 8 to 10.
Figure 14:
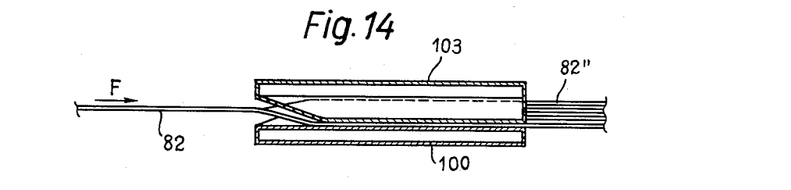
Figure 15:
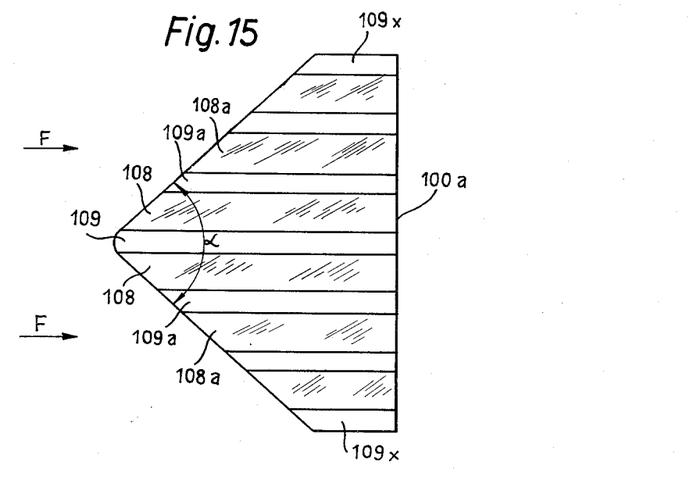
FIGURE 15 is a plan view of a further embodiment of one of the moulds shown in FIG. 12.

In FIGURE 13 it will be seen that the bottom mould 100 is fixedly arranged on a bedplate diagrammatically denoted by 110; the operative shaped mould surface faces upward, the bevels 108′ of the mould tenons facing opposite the direction of feed f of the softened thermoplastic web 82. The top mould 103 is shown in a position downstream the mould 100, said mould 103 being provided with supports 111 having rollers 112 which guide it longitudinally on a rail 113. It will be understood that two such rails at least will be provided and arranged in parallel relationship in order to smoothly guide the mould 103. As shown in the FIGURE 13, the bevels 108′ of the latter mould also face opposite the direction f, the mould 103 being so arranged relatively to the mould 100 that the tenons 108 of the mould 103 are longitudinally aligned with the channels 109 in the mould 100.

The conditions shown in FIGURE 13 correspond to the start of the corrugating process; in these conditions the web 83 slides on the ridges of the tenons on both moulds and merely undergoes slight corrugating deformations. However, as soon as the leading edge of the web 82 reaches between the web trailing means 88—91 (FIGURE 11), the top mould 103 is gradually moved to the left of FIGURE 13, so that its tenons 108 enter the channels 109 in the bottom mould 100, as shown on a somewhat enlarged scale in FIGURE 14. On reaching this position the top mould 103 is stopped during the whole further prosecution of the process which therefore takes place under similar conditions as described with reference to FIGURES 1 through 7. More particularly, the web 82 is subjected to a longitudinal stretching by the action of the driving means 88—91 and a transverse stretching under the action of the tenons 108 on the moulds which draw and stretch the web 82 under conditions substantially similar as described with reference to FIGURE 7. It will be understood that cooling water flows through the moulds so that the dove-tail shaped deformations imparted to the web are set in a relatively permanent manner. Reference has been made to a "relatively permanent" condition, inasmuch as this is the feature distinguishing the corrugated sheets according to this invention over sheets manufactured by extrusion. In fact, drawing and stretching sets up in the web material latent stresses which are set on cooling of the web between the moulds but can be released by again heating the web near its softening temperature. Consequently, corrugated sheets manufactured by extrusion and subsequently heated will not exhibit any tendency to contract in width, and only a light tendency to longitudinal shrinking, while on the contrary, sheets manufactured according to this invention, when heated near their softening temperature, tend to shrink both in width and length, thereby clearly disclosing the prior existence of latent stresses as mentioned above, hence the manner in which they have been manufactured, transverse shrinking being accompanied by flattening of the corrugations previously imparted to the sheet.

When the corrugations are relatively deep, transverse stretching of the web may not be uniform throughout the web width. In this case it may be convenient to employ moulds of the construction visible in plan in FIGURE 15, wherein the mould is indicated by 100a, and f still denotes the direction of travel of the web between the moulds. The mould 100a is of a general symmetrical wedge shape, the wedge tapering against the direction f. A web reaching between a pair of such moulds is therefore engaged at first along a middle longitudinal region which is impressed in the channel 109 by the corresponding tenon on the cooperating mould. Transverse drawing and stretching thus starts at this channel 109 and adjacent tenons 108, 108. Subsequently, two further longitudinal regions on the web are impressed in the channels 109a, 109a so that drawing, which has started at the middle region gradually extends over the channels 109a, 109a, tenons 108a, 108a and so on, towards the longitudinal edges of the web up to the marginal regions 109x, 109x on the mould. The angle α at the wedge top depends, of course, upon the drawing conditions, that is nature of the thermoplastic web material, web thickness, depth of corrugations, etc. Generally, to thorough drawing there correspond small values of the angle α and vice versa.

It should be noted that certain arrangements which shall be described hereafter, permit of dispensing with the top mould without any objectionable consequence, advantages even resulting therefrom. For this purpose the bottom mould which is in the form of a sheet metal case is provided on its operative surface with at least two transverse rows of suction holes opening into the case at suction manifolds adapted to be connected with a source of vacuum, means being provided for temporarily deforming the thermoplastic web as the corrugating process starts to bring it throughout its width within the range of the suction holes.

In FIGURES 16 to 18, 130 denotes the sheet metal case-shaped mould, the top wall 131 of which is corrugated along any desired profile, the ridges and valleys extending in the direction F of travel of the web. In operation cooling water circulator through the mould which is provided for this purpose with connections such as 132. The inner face of the corrugated wall 131 of the mould has welded thereto three manifolds 133, 134, 135 extending transversely of the longitudinal direction F of the mould, said manifolds connecting with the outside through their connections 136, 137, 138, respectively, adapted to be connected with a source of vacuum. The wall 131 is foraminated above each of the manifolds throughout its width as indicated by 139, 140, 141. The rows of holes 139, 140, 141 as well as the manifolds 133, 134, 135 are spaced apart in the longitudinal direction F of the mould over a distance of 10 to 20 cm. The diameter of the holes was found to be rather critical, said diameter depending above all upon the thermoplastic material. In the most frequent case, in which corrugated sheets from polyvinyl resins have to be manufactured, the minimum thickness of which is about 3 mm., the diameter of the holes should range between 0.5 and 1.5 mm., the vacuum in the manifolds amounting at the utmost to 70 cm. water column. The holes in each row are arranged as close as possible, which does not in the least weaken the mould structure which is braced by manifolds 133, 134, 135. It will be understood that in FIGURES 17 and 18 the hole size has been somewhat exaggerated for the sake of clearness of the drawing.

Figure 18:
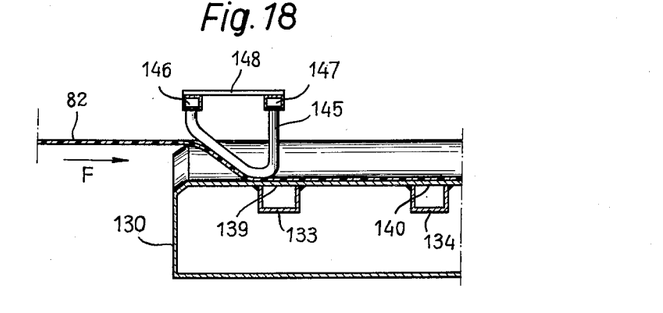
FIGURE 18 is a view similar to that of FIGURE 17 showing the manner in which the thermoplastic web is initially applied against the operative surface of the mould.

In operation a thermoplastic web 82 is carried along in the direction F (FIGURE 18) as it has been heated to a temperature near its softening temperature; the mould 140 has cooling water flowing therethrough, the manifolds 133, 134, 135 being connected to the source of vacuum. Under these circumstances the web 82 would merely slide on the ridges of the corrugations on the top wall 131 of the mould, without fitting the valleys, all the more so as the web is subjected to a longitudinal traction, as explained with reference to FIGURES 1 to 11. Therefore, in order to deflect the web towards the valleys on the corrugations, as indicated in FIGURE 18, the mould 130 has associated therewith a baffle device comprising in the example shown a transverse series of U-shaped metal tubes 145 spaced apart by the same extent as the valleys on the corrugations. Both branches of the U-shaped tubes face upwardly and connect with transverse manifolds 146, 147, respectively, for inlet and outlet, respectively, of cooling water which therefore flows through the tubes 145. The manifolds 146, 147 are rigidly interconnected by bars 148 to a rigid unit which may be bodily lifted and lowered with respect to the mould 130 by any suitable means, not shown on the drawing. On starting the corrugation process as the web slides on the ridges of the corrugations as mentioned above, the baffle device is momentarily lowered to the position shown, so that the web comes throughout its width within reach of the suction holes 139, 140, 141 which then suck the web and cause it to accurately apply against the operative face of the mould. On reaching said condition the baffle device 145—148 is lifted and put out of operation, the vacuum propagating through the holes 139, 140, 141 being sufficient for retaining the web 82 in a perfect overall contact with the mould. On sliding on the mould the web 82 is cooled and retains thereby the corrugated shape imparted thereto. When necessary, with relatively thick webs, a plurality of moulds of the type shown can be arranged in sequence.

The use of foraminated or porous moulds for vacuum-shaping thermoplastic webs is known per se in the art. However, the known processes operate discontinuously i.e. a sheet is placed on a mould, is sucked against the operative surface of the mould and maintained under such condition till it has thoroughly hardened. As distinct therefrom, according to this invention, the web 82 moves continuously with respect to the mould and, as it slides over the first as well as the second row of holes 139, 140, it is still in a plastic condition. Against any expectation the thermoplastic web material does not choke the holes 139, 140 but slides relatively easily over the corrugated wall 139 which, on the other hand, is highly polished as stated with reference to the moulds 27, 28 shown in FIGURE 2. Obviously, therefore, the mould 130 according to this invention could not be replaced, e.g. by a porous mould known from the prior art. A further essential point resides in the fact that, as shown by FIGURE 18, the baffle device 145, 148 is arranged somewhat ahead of the first row of holes 139. As a result the lower surface of the thermoplastic web 82 is cooled and hardened by the mould wall 131 before reaching the holes 139, the hardened film which then coats said lower web surface preventing the holes 139 and any further hole to scrape from the web any thermoplastic material and become obstructed or anyhow injure the web.

Figure 16:
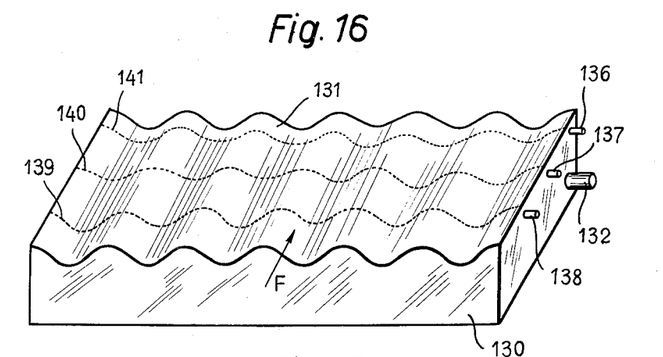
FIGURE 16 is a perspective view of a mould for use in a modification of the method.
Figure 17:
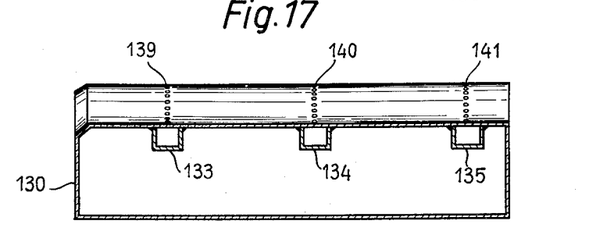
FIGURE 17 is a sectional view of the mould shown in FIGURE 16 on a longitudinal vertical plane extending through the valley of a corrugation.

The prominent advantages of the embodiment shown in FIGURES 16 to 18 are ascertained when the web such as 82 should be corrugated along a relatively complex profile with undercut portions, instead of simple sinusoidal corrugations as shown. A simple baffle device such as 145—148 is then sufficient for deflecting the web into any complex valleys in the wall 131, whereafter the sucking action of the holes 139, 140, 141 is thoroughly sufficient for holding the web accurately applied against the profile of the wall 131 throughout the corrugating process.

What I claim is:

1. In a process of corrugating a web of a thermoplastic material by means of a mould having a corrugated face the steps of continuously trailing the web along a predetermined path; heating the web in a longitudinally tensioned condition within a longitudinally limited region of the path up to substantially the softening temperature of the thermoplastic material thereby longitudinally stretching the web; positioning the mould on a region of the path downstream of the firstmentioned region with the corrugations on the corrugated face of the mould extending longitudinally of the path; pressing softened longitudinally tensioned incremental zones of the web against the corrugated face of the mould while maintaining substantially the original width of the web and while trailing the web in sliding contact with the undulated face of the mould at a speed which is lower than the speed at the exit from the firstmentioned region thereby transversely stretching the said incremental zones of the web while undulating it, and cooling the web while in contact with the mould.

2. In the process as claimed in claim 1, wherein a complementarily undulated mould is employed for pressing the web against the undulated face of the first named mould, the step of reciprocating one of the moulds in a direction perpendicular to the general plane of the web through a stroke smaller than the depth of undulations being impressed.

3. An apparatus for continuously undulating a travelling web of thermoplastic material comprising on the path of the web; a first pair of peripherally opposed feed rollers arranged to engage said web therebetween, and mounted for driven rotation to feed said web along said path; a second pair of similar peripherally opposed feed rollers spaced downstream on said path from said first pair, said second pair of rollers being driven at a higher speed than said first pair for longitudinally tensioning said web, heating means intermediate said first and second pair of feed rollers, capable of heating incremental zones of the web up to substantially softening temperature of the thermoplastic material while in longitudinally tensioned condition; a mould having a cooled undulated face with the undulations on the face extending lengthwise of the path downstream of the said heating means and feed rollers; means for trailing the web through said mould in contact with said face thereof at a speed which is lower than the speed at the exit from heating means; and means capable of pressing the web against the said face of the mould across the whole width of the web while the web is trailed in sliding contact with the said face.

4. In the apparatus as claimed in claim 3, at least one of the undulations on one mould consisting of a tenon having underhanging surface zones, and at least one of the undulations on the other mould consists of a mortise having a cross sectional profile complementary with the tenon; and means slidably supporting one of the moulds lengthwise of the path of the web with the said tenon lengthwise aligned with the said mortise.

References Cited in the file of this patent

UNITED STATES PATENTS

| | | |
|---|---|---|
| 2,490,781 | Cloud | Dec. 13, 1949 |
| 2,559,365 | Middleton et al. | July 3, 1951 |
| 2,571,715 | Henning | Oct. 16, 1951 |
| 2,682,292 | Nagin | June 29, 1954 |
| 2,739,089 | Hageltorn | Mar. 20, 1956 |
| 2,784,763 | Shorts | Mar. 12, 1957 |

FOREIGN PATENTS

| | | |
|---|---|---|
| 422,431 | Italy | June 18, 1947 |
| 168,657 | Austria | July 10, 1951 |
| 160,551 | Australia | Jan. 13, 1955 |